US012712997B2

(12) United States Patent
Schelberg et al.

(10) Patent No.: US 12,712,997 B2
(45) Date of Patent: Aug. 18, 2026

(54) POLARIZATION TECHNIQUES FOR A VISUAL EFFECTS SYSTEM

(71) Applicant: Universal City Studios LLC, Universal City, CA (US)

(72) Inventors: Jonathan Reid Schelberg, Orlando, FL (US); Howard Bruce Mall, Winter Springs, FL (US); Timothy Fitzgerald Garnier, Orlando, FL (US); Akiva Meir Krauthamer, Winter Garden, FL (US); Aaron Chandler Jeromin, Winter Garden, FL (US)

(73) Assignee: Universal City Studios LLC, Universal City, CA (US)

( * ) Notice: Subject to any disclaimer, the term of this patent is extended or adjusted under 35 U.S.C. 154(b) by 309 days.

(21) Appl. No.: 18/538,845

(22) Filed: Dec. 13, 2023

(65) Prior Publication Data

US 2025/0039351 A1 Jan. 30, 2025

Related U.S. Application Data

(60) Provisional application No. 63/529,240, filed on Jul. 27, 2023.

(51) Int. Cl.
*H04N 13/00* (2018.01)
*H04N 13/337* (2018.01)
*H04N 13/351* (2018.01)

(52) U.S. Cl.
CPC ......... *H04N 13/337* (2018.05); *H04N 13/351* (2018.05)

(58) Field of Classification Search
CPC .. H04N 13/337; H04N 13/351; H04N 13/346; H04N 13/30; H04N 13/332; H04N 13/339; H04N 13/341; G02B 27/28; G02B 30/00; G02B 30/10; G02B 30/20; G02B 30/22; G02B 30/24; G02B 30/25; G02B 30/34
USPC ........................................................ 359/465
See application file for complete search history.

(56) References Cited

U.S. PATENT DOCUMENTS 2,845,618 A 7/1958 Huffman
6,449,090 B1 9/2002 Omar et al.
7,394,506 B2 7/2008 Cirkel et al.
8,692,738 B2 4/2014 Smithwick et al.
9,262,866 B2 2/2016 Tsao et al.
10,139,644 B2 11/2018 Rong et al.
10,739,613 B2 8/2020 Joseph et al.
(Continued)

FOREIGN PATENT DOCUMENTS

KR 20130064944 A 6/2013

OTHER PUBLICATIONS

PCT/US2024/039179 International Search Report and Written Opinion mailed Oct. 31, 2024.
(Continued)

*Primary Examiner* — Henry Duong
(74) *Attorney, Agent, or Firm* — Fletcher Yoder, P.C.

(57) ABSTRACT

A visual effects system includes a first display, wherein the first display includes a polarized filter on or in the first display, and a second display, wherein the second display is not polarized. The visual effects system also includes a beam splitter positioned to enable a guest to view the first display through the beam splitter and a reflection of the second display via the beam splitter.

20 Claims, 6 Drawing Sheets

(56) References Cited

U.S. PATENT DOCUMENTS

| | | | | |
|---|---|---|---|---|
| 11,163,170 | B2 | 11/2021 | Yamada | |
| 11,347,058 | B2 | 5/2022 | Smithwick et al. | |
| 2006/0268407 | A1 * | 11/2006 | Fergason | H04N 13/346 359/485.02 |
| 2015/0116658 | A1 * | 4/2015 | Trapani | G02C 7/12 351/178 |

OTHER PUBLICATIONS

Equitynet, "Invisible Imaging, Inc.," Entertainment Company, Company Overview, https://www.equitynet.com/c/invisible-imaging-inc?sp=NG , Last Accessed Jan. 30, 2023, 4 Pages.

* cited by examiner

POLARIZATION TECHNIQUES FOR A VISUAL EFFECTS SYSTEM

CROSS-REFERENCE TO RELATED APPLICATION

This application claims priority to and the benefit of U.S. Provisional Application No. 63/529,240, entitled "POLARIZATION TECHNIQUES FOR A VISUAL EFFECTS SYSTEM" and filed Jul. 27, 2023, which is incorporated by reference herein in its entirety for all purposes.

BACKGROUND

The present disclosure generally relates to a visual effects system that provides visual effects in a venue, such as in an amusement park.

A venue, such as an amusement park, may include a variety of attractions. Some attractions may include three-dimensional imagery (e.g., an offset pair of two-dimensional images of a feature that, when viewed through appropriate lenses, creates an illusion of the feature being three-dimensional), volumetric displays, and/or other special effects, which help immerse the guests in the attractions. However, it is presently recognized that the guests may be limited to a singular experience on the attractions and/or may have limited ways to experience the attractions, for example. With increasing sophistication and complexity of modern ride attractions, it is also presently recognized that it may be desirable to provide improved and more creative visual effects to create unique experiences for the guests in the attractions.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, a visual effects system includes a first display, wherein the first display includes a polarized filter on or in the first display, and a second display, wherein the second display is not polarized. The visual effects system also includes a beam splitter positioned to enable a guest to view the first display through the beam splitter and a reflection of the second display via the beam splitter.

In an embodiment, a visual effects system includes a first display, wherein the first display includes a polarized filter on or in the first display, and a second display, wherein the second display is not polarized. The visual effects system also includes a beam splitter positioned to enable a guest to view the first display through the beam splitter and a reflection of the second display via the beam splitter, and eyewear configured to be worn by the guest, wherein the eyewear includes a first lens including an additional polarized filter.

In an embodiment, a method of operating a visual effects system includes generating, at a processor, image data for a first display and a second display, and instructing, via the processor, transmission of the image data to the first display and to the second display, wherein the first display is configured to display a first image based on the image data and the second display is configured to display a second image based on the image data. Further, the method includes reflecting, via a beam splitter, the second image toward the first display, using a first polarization filter associated with the first display to enable visualization of the first image by a guest, and placing a second polarization filter between the guest and the first display to enable visualization of the second image by the guest.

DRAWINGS

These and other features, aspects, and advantages of the present disclosure will become better understood when the following detailed description is read with reference to the accompanying drawings in which like characters represent like parts throughout the drawings, wherein.

Figure 1:
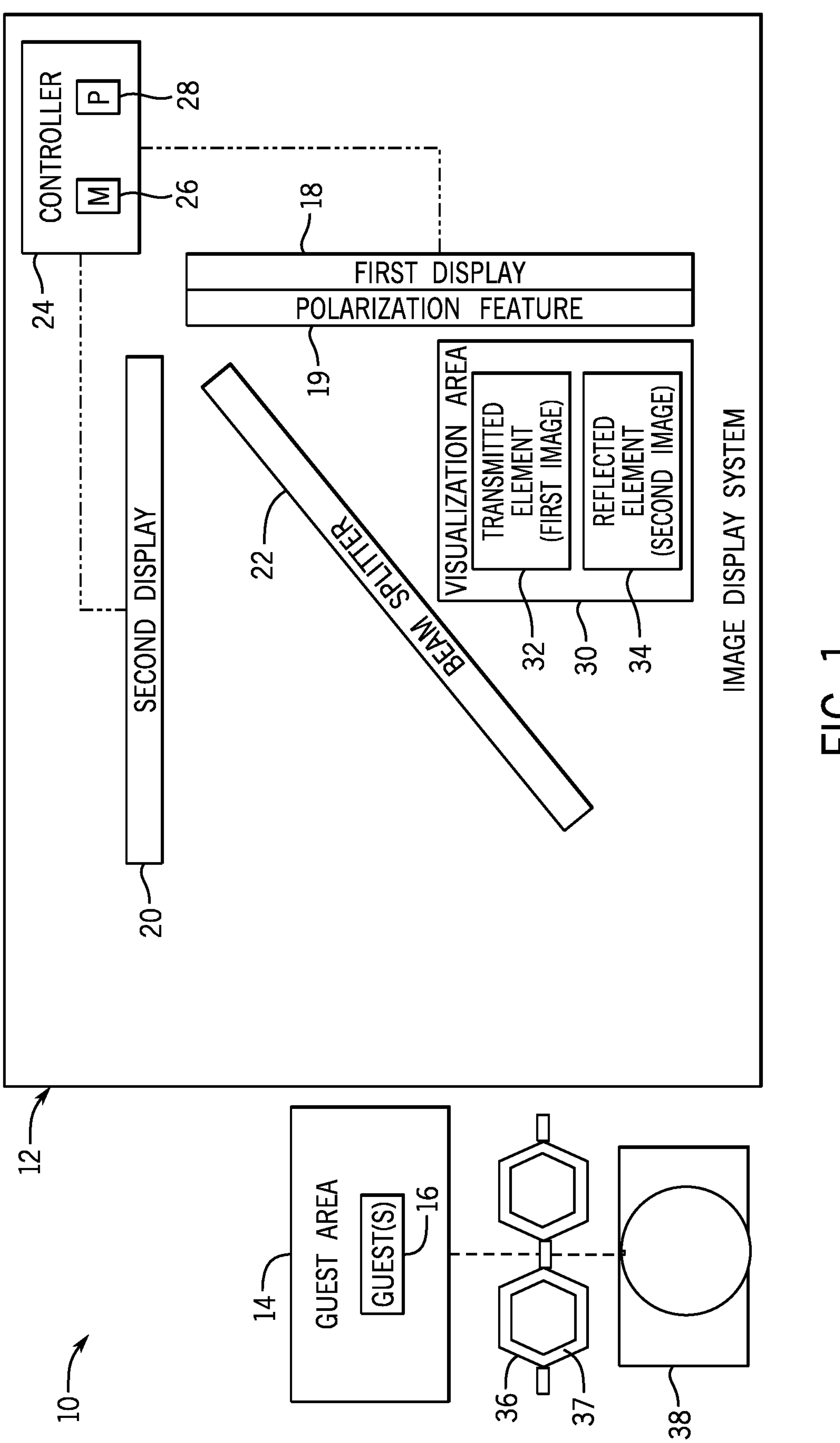
FIG. 1 is a schematic diagram of an attraction that includes a visual effects system, in accordance with an embodiment of the present disclosure.
Figure 5:
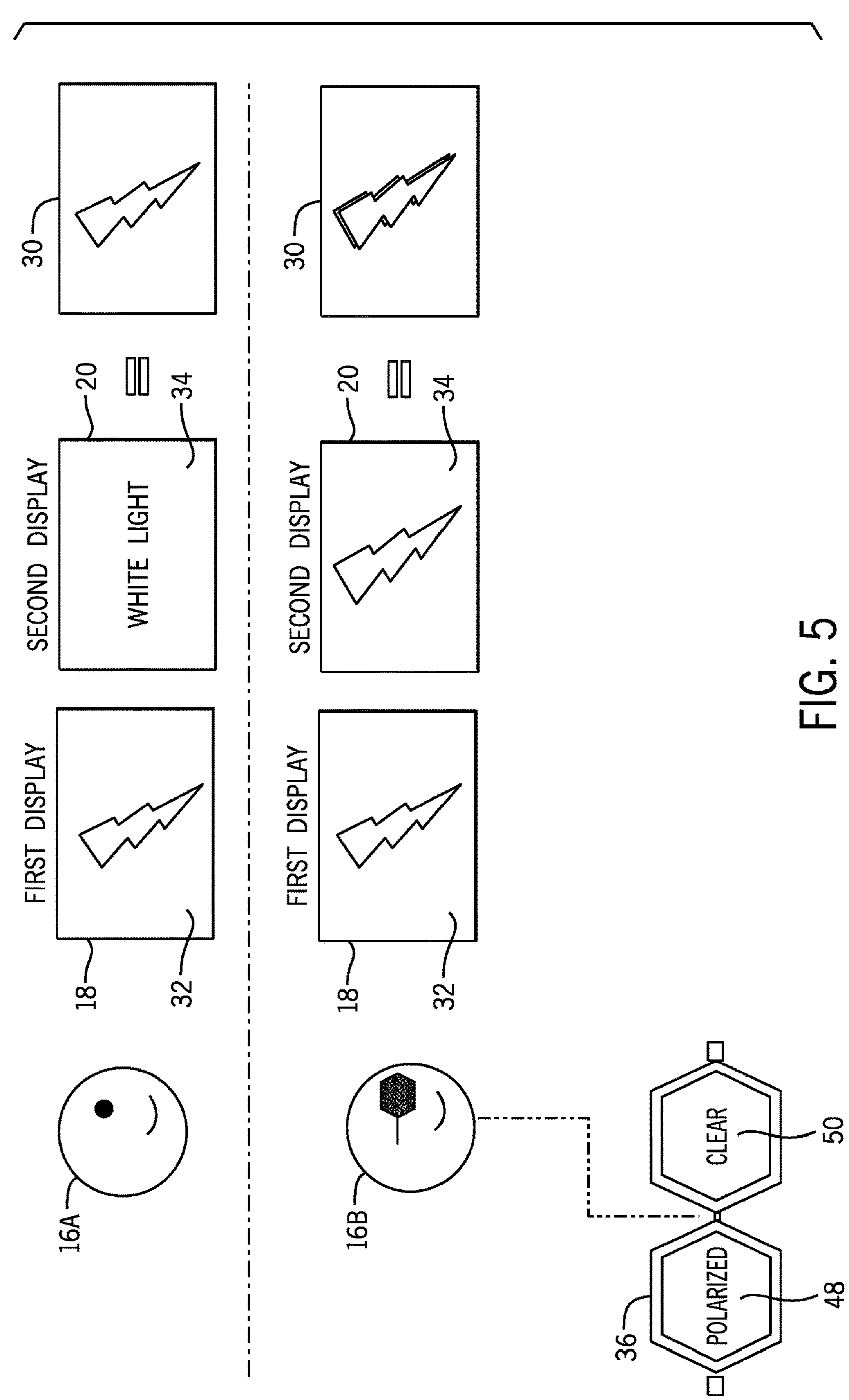
Figure 6:
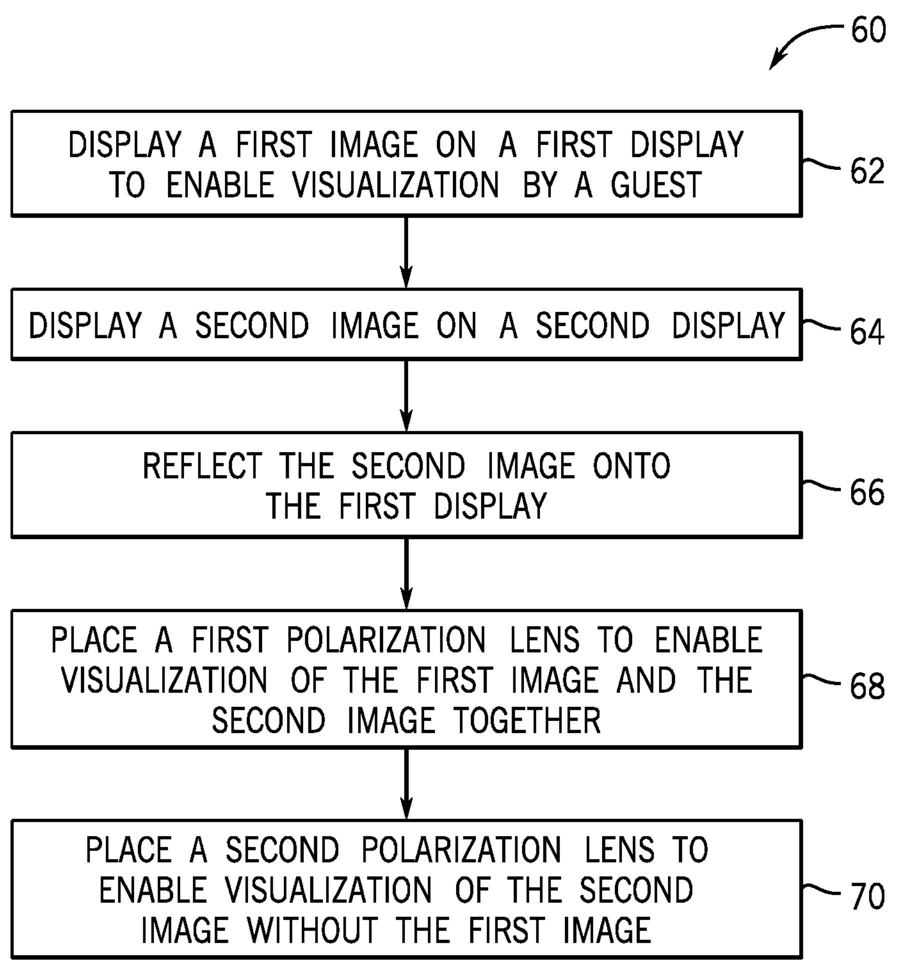

FIG. 5 illustrates the displaying of elements by the visual effects system of FIG. 1 to create a two-dimensional visual effect that is viewable by the guest without the use of lenses and a three-dimensional visual effect that is viewable by the guest with lenses, in accordance with an embodiment of the present disclosure; and FIG. 6 is a flow diagram of a method for providing a visual effect to a guest via a visual effects system, in accordance with an aspect of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is directed to a visual effects system that provides visual effects (e.g., image effects). The visual effects system may operate in any of a variety of venues, such as in an amusement park, a restaurant, a hotel, a theatre, a stadium, and so forth. The venue may include a variety of features, such as rides (e.g., a roller coaster), theatrical shows, set designs, performers, and/or decoration elements, to entertain guests. Image effects may be used to supplement or complement the features, such as to provide the guests with a more immersive and/or unique experience. For example, the image effects may be presented to emulate real-world elements in order to present a more realistic atmosphere for the guests.

The visual effects system may utilize multiple displays to provide a variety of image effects. For example, the visual effects system may display virtual objects that may supplement an appearance of real-world objects and/or other virtual objects via a Pepper's Ghost technique. Generally, the visual effects system may employ a primary area (e.g., a background scene, a first scene, a first display), a secondary area (e.g., an augmented reality scene, a second scene, a second display), and an optical beam splitter (e.g., glass). The optical beam splitter may be arranged to enable transmission of imagery of the primary area to enable a guest to view the imagery of the primary area through the optical beam splitter. The optical beam splitter may also reflect imagery from the secondary area to enable the guest to view the reflected imagery from the secondary area. As such, the guest may observe imagery from the primary area (e.g., real imagery from the primary area viewable through the optical beam splitter) and imagery from the secondary area (e.g., virtual imagery reflected from the secondary area off the optical beam splitter) that are combined, superimposed, or overlaid with respect to one another via the optical beam splitter (e.g., referred to herein as "combined imagery"). Additionally, the visual effects system may include lighting to illuminate and/or improve visualization of aspects of the combined imagery, while blocking illumination of the optical beam splitter. As such, the visual effects system may realistically portray elements of the imagery from the secondary area such that the guest perceives them as present with the imagery from the primary area, at least in certain conditions (e.g., while the guest wears polarized lenses).

In this way, the visual effects system may utilize certain Pepper's Ghost techniques to provide a more realistic portrayal of combined imagery. Further, the visual effects system may utilize polarization techniques to selectively enable the guest to view imagery from the primary area, imagery from the secondary area, and/or the combined imagery. In particular, the visual effects system may include a first display (e.g., the primary area) and a second display (e.g., the secondary area) positioned at particular orientations (e.g., perpendicular to each other). Further, the optical beam splitter may be positioned at an angle between the first display and the second display to enable a reflection of one or more images from the second display.

The first display may include a polarization layer, such as a polarized coating or filter, and may be positioned in view of the guest. The second display may be devoid of a polarization layer (e.g., have the polarization layer removed), thus causing the second display to not be polarized (e.g., nonpolarized, unpolarized). Additionally, the second display may be positioned out of view of the guest. The first display may be configured to display a first image (e.g., imagery) to enable visualization by the guest. Moreover, the second display may be configured to display a second image (e.g., imagery) on the second display, and the second image is reflected onto the first display via the optical beam splitter. In this manner, the guest may view the first image displayed by the first display and/or the second image displayed by the second display, at least in certain conditions (e.g., while the guest wears the polarized lenses).

In one embodiment, the guest may directly view the first image with the naked eye (e.g., not wearing the polarized lenses, not looking through an additional polarization layer). Further, because the second display is not polarized, the second image displayed by the second display may appear to the guest as a white light. In this manner, the first image may appear brighter to the guest. In one embodiment, the guest may don (e.g., equip) glasses that may include the polarized lenses. The polarized lenses may polarize the second display. Further, the polarization layer of the first display and the polarized lenses may be oriented in orthogonal directions (e.g., a first direction orthogonal to a second direction). As such, due to these orientations of the polarization layer and the polarized lenses, the first display may appear to be darkened (e.g., become visually black to the guest), while the second image from the second display is reflected and visible to the guest. In this manner, the first display may appear as deactivated to the guest, while the second image from the second display is visible to the guest.

In one embodiment, the first display may include the polarization layer (e.g., polarized by a manufacturer) that is oriented in any direction that is not orthogonal to the second direction that is appropriate to re-polarize the second display. In this manner, when the guest puts on the glasses with the polarized lenses, the guest may visualize the first image displayed by the first display and the second image displayed by the second display. Indeed, in such cases, the second image may appear to the guest to be overlaid, superimposed, or combined with the first image due to the optical beam splitter and polarization features.

In one embodiment, the second display may not be polarized and is out of view. The guest may visualize the first image on the first display without the use of glasses. Subsequently, the guest may put on glasses in which one lens is polarized while the other lens is not polarized. The nonpolarized lens of the glasses may enable visualization of the first image of the first display. Additionally, the polarized lens may enable visualization of the second image of the second display (e.g., which is reflected onto the first display via the optical beam splitter). As such, the glasses with the polarized lens may enable visualization of a three-dimensional (3D) image. Thus, the present embodiments advantageously enable the presentation of multiple visual effects and may also enable the guest to determine the type of visualization they wish to experience during the attraction.

With the preceding in mind, FIG. 1 is a schematic view of an attraction 10 (e.g., environment or venue) that includes a visual effects system 12, in accordance with an embodiment of the present disclosure. The attraction 10 may include a guest area 14 where one or more guests 16 may be positioned. As an example, the guest area 14 may include a path (e.g., a walkway, a queue, a line) through which the guest(s) 16 may navigate. As another example, the guest area 14 may include a space (e.g., a seating area) where the guest(s) 16 may be positioned to view a performance. As a further example, the guest area 14 may include a ride vehicle that may move and carry the guest(s) 16 throughout the attraction 10.

Furthermore, the attraction 10 may include the visual effects system 12 that may provide entertainment to the guest(s) 16 located in the guest area 14 and/or in the attraction 10. For example, the visual effects system 12 may create visual effects that are viewable by the guest(s) 16. The visual effects system 12 may include a first display 18 with a polarization feature 19 (e.g., a polarization layer), a second display 20 (e.g., devoid of a polarization layer), a beam splitter 22 (e.g., glass), and a controller 24 (e.g., electronic controller). The controller may include a memory 26 and a processor 28. Additionally, the visual effects system 12 may include a visualization area 30 (e.g., a primary area, a background scene). The guest(s) 16 may view a transmitted element 32 (e.g., first image) and/or a reflected element 34 (e.g., second image) at the visualization area 30 while the guest(s) 16 are in the guest area 14. While the visualization area 30 is shown schematically in FIG. 1 with the transmitted element 32 and the reflected element 34 to facilitate discussion of these elements, it should be appreciated that the visualization area 30 may be all or a portion of the first display 18 (e.g., a guest-facing surface of the first display 18) or otherwise aligned with (e.g., in a plane of) the first display 18.

The first display 18 and/or the second display 20 may include any suitable display (e.g., liquid crystal display (LCD), light emitting diode (LED) display, organic light emitting diode (OLED) display, micro-LED, transparent LCD display) that receives image data and projects (e.g., displays, transmits) the image data as imagery. In some embodiments, the image data may include objects in motion. That is, the image data may include scenes where various elements within image frames of the image data are changing positions and/or configurations. In one embodiment, the first display 18 and/or the second display 20 may include a two-dimensional (2D) display. In an alternative embodiment, the first display 18 and/or the second display 20 may include a 3D or volumetric display, such as an autostereoscopic display, a light field display, and the like. In one embodiment, a first projector and a second projector may be interchanged with the first display 18 and the second display 20. The first projector and the second projector may implement similar polarization techniques as the first display 18 and the second display 20.

The first display 18 may include the polarization feature 19, such as a polarized coating or layer on an outer surface (e.g., guest-facing outer surface) of the first display 18. Alternatively, the polarization feature 19 may be formed within, embedded in, or formed on any suitable surface of the first display 18. The polarization feature 19 may have polarization characteristics to act as a filtered lens that only permits polarized light having appropriate characteristics to pass through. In one embodiment, the polarization feature 19 may be oriented in a direction (e.g., a first direction). The polarization feature may be adjustable, such that the polarization characteristics acting as the filtered lens may be adjustable (e.g., rotated 90 degrees, 180 degrees, or 270 degrees). In one embodiment, the polarization feature 19 may be a linear polarization filter, such as a linear polarization filter that is oriented orthogonally or parallel relative to a plane of incidence of light on a surface of the polarization feature 19. In another embodiment, the polarization feature 19 may be a circular polarization filter, such as a circular polarization filter that is left or right handed.

The first display 18 may be positioned to be viewed by the guest(s) 16 within the guest area 14. The first display 18 may display a first image for visualization by the guest(s) 16. The first image may be the transmitted element 32 of the visualization area 30 and may be seen directly by the guest(s) 16 through the beam splitter 22.

The visual effects system 12 may include the beam splitter 22 positioned to combine imagery from the first display 18 and the second display 20. For example, the guest(s) 16 may view the first image on the first display 18 through the beam splitter 22. That is, the guest(s) 16 may see through the beam splitter 22 and directly view the first image being displayed by the first display 18 in the visualization area 30. Further, the guest(s) 16 may view the second image displayed by the second display 20 that is reflected by the beam splitter 22 toward the first display 18. Indeed, the guest(s) 16 may see a reflection of the second image at the first display 18. The beam splitter 22 may be oriented such that the reflection of the second image may provide the reflected element 34 that appears to be positioned in the visualization area 30, such as adjacent to the transmitted element 32. By way of example, the beam splitter 22 may be angled (e.g., at a 45 degree angle) with respect to a line of sight of the guest(s) 16 toward the visualization area 30. Further, the beam splitter 22 may be made from a material, such as glass, plastic, foil, and/or a semi-transparent mirror, that includes both transmissive and reflective properties to enable viewing of the transmitted element 32 of the visualization area 30 through the beam splitter 22 and viewing of the reflected element 34 of the visualization area 30 as reflected off the beam splitter 22.

Moreover, the visual effects system 12 may include the controller 24 (e.g., an automation controller, a programmable logic controller, an electronic controller) configured to operate to adjust the experience provided to the guest(s) 16 via the visual effects system 12. The controller 24 may include the memory 26 and the processor 28. The memory 26 may include volatile memory, such as random access memory (RAM), and/or non-volatile memory, such as read-only memory (ROM), optical drives, hard disc drives, solid-state drives, or any other non-transitory computer-readable medium that includes instructions. The processor 28 may be configured to execute such instructions. For example, the processor 28 may include one or more application specific integrated circuits (ASICs), one or more field programmable gate arrays (FPGAs), one or more general purpose processors, or any combination thereof.

The controller 24 may send (e.g., instruct transmission of the image data to the first display 18) image data to the first display 18 to provide the first image based on the image data. Additionally or alternatively, the controller 24 may send the image data to the second display 20 to provide the second image based on the image data. The controller 24 may adjust and update the image data sent to the first display 18 and/or the second display 20 to adjust the appearance of the first image and/or the second image. As such, the adjustment may also cause a corresponding adjustment to the appearance of the transmitted element 32 and/or the reflected element 34 in the visualization area 30. It should be appreciated that the controller 24 may include additional components, such as input/output (I/O) devices and/or a communication component. The communication component may be a wired or a wireless component that may facilitate communication between the controller 24, the first display 18, the second display 20, and/or various other types of devices (e.g., the controller 24 may instruct the communication component to send or to transmit data, such as the image data).

In an embodiment, a mechanism (e.g., an actuator, a gear, or any other suitable mechanical linkage) may be coupled to the polarization feature 19, which may enable movement (e.g., insertion, removal, rotation) of the polarization feature 19. That is, the controller 24 may instruct the mechanism to perform the movement of the polarization feature 19. For example, the controller 24 may instruct the mechanism to remove the polarization feature 19 from in front of the first display 18. The mechanism may then begin to move the polarization feature 19 away from the front of the first display 18 (e.g., no longer overlaid on part or all of the first display 18).

In one embodiment, the guest(s) 16 may use a pair of glasses 36 (e.g., eyewear; where one or both lenses are polarized) or a polarization film 38 to modify a visualization of the first image and the second image. The pair of glasses 36 may be configured to be worn be worn on a head of the guest(s) 16, wherein the lenses of the pair of glasses 36 (e.g., which may be provided in frame 37 of the pair of glasses 36) cover both eyes of the guest(s) 16. The polarization film 38 may be integrated into a portable device (e.g., handheld or wearable device carried by the guest(s) 16)), a ride vehicle that carries the guest(s) 16, a movable platform that moves relative to the guest(s) 16, and so forth. It should be noted that although the pair of glasses 36 and the polarization film 38 are described herein, any suitable polarization technique may be incorporated that may provide similar interactions with the visual effects system 12. For ease of discussion, the description of the visual effects system 12 provided herein is made with reference to the pair of glasses 36. However, it should be noted that the visual effects system 12, as described herein, is not limited to such embodiments. Additional details with regard to the visualization provided to the guest(s) 16 via the pair of glasses 36 will be discussed below with reference to FIGS. 2-5.

Figure 2:
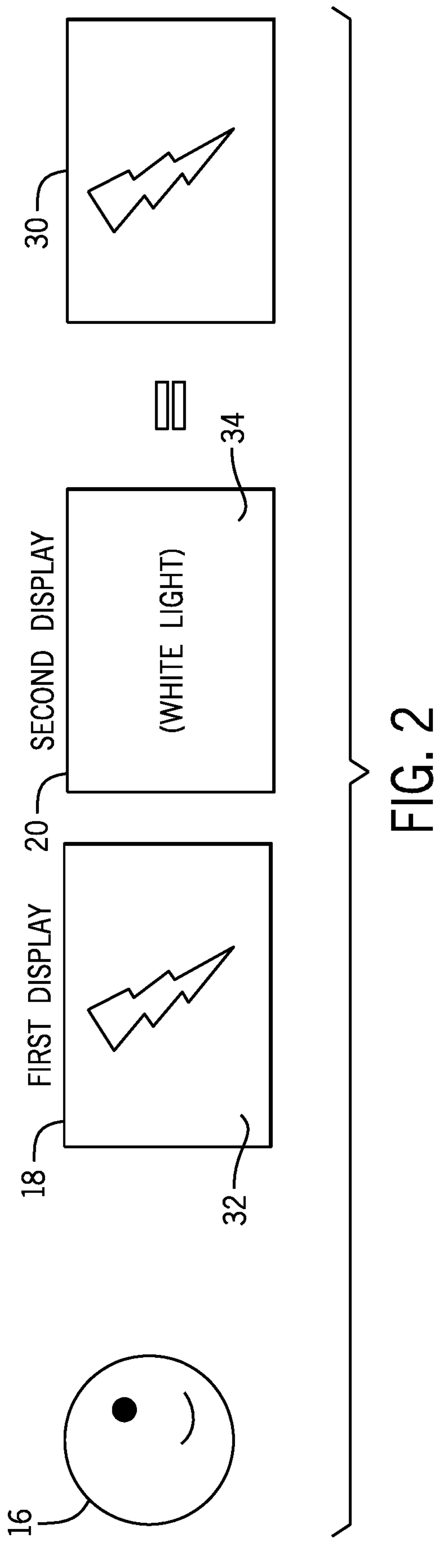
FIG. 2 illustrates the displaying of elements by the visual effects system of FIG. 1 to create a visual effect that is viewable by a guest without the use of lenses, in accordance with an embodiment of the present disclosure.

FIG. 2 is an illustration of the visual effects system 12 of FIG. 1, in accordance with an embodiment of the present disclosure. In particular, FIG. 2 illustrates the guest 16 viewing the visualization area 30 (e.g., the transmitted element 32 and/or the reflected element 34) via the first display 18 and the second display 20 respectively. The first display 18 may include the polarization feature 19 (FIG. 1), and the second display 20 may be devoid of any polarization feature. In the illustrated example, the first display 18 may provide the transmitted element 32, and the second display 20 may provide the reflected element 34. The guest 16 may be directly viewing the visualization area 30 with the naked eye (e.g., without lenses).

As shown in FIG. 2, the first display 18 may display the transmitted element 32 directly to the guest 16. Since the second display 20 is not polarized, the reflected element 34 of the second display 20 may appear as a white light to the guest 16. Therefore, the visualization area 30 may include the transmitted element 32 displayed to the guest 16, and the white light of the reflected element 34 (via the beam splitter 22) may be combined with the transmitted element 32. In this manner, the transmitted element 32 displayed to the guest 16 may appear brighter (e.g., more vivid).

As an example, as shown in FIG. 2, the transmitted element 32 may include an image of a lightning bolt. Additionally, the reflected element 34 may include the white light. The white light of the reflected element 34 may be combined with the image of the lightning bolt of the transmitted element 32. Thus, the visualization area 30 may display a brighter image of the lightning bolt for viewing by the guest 16.

Figure 3:
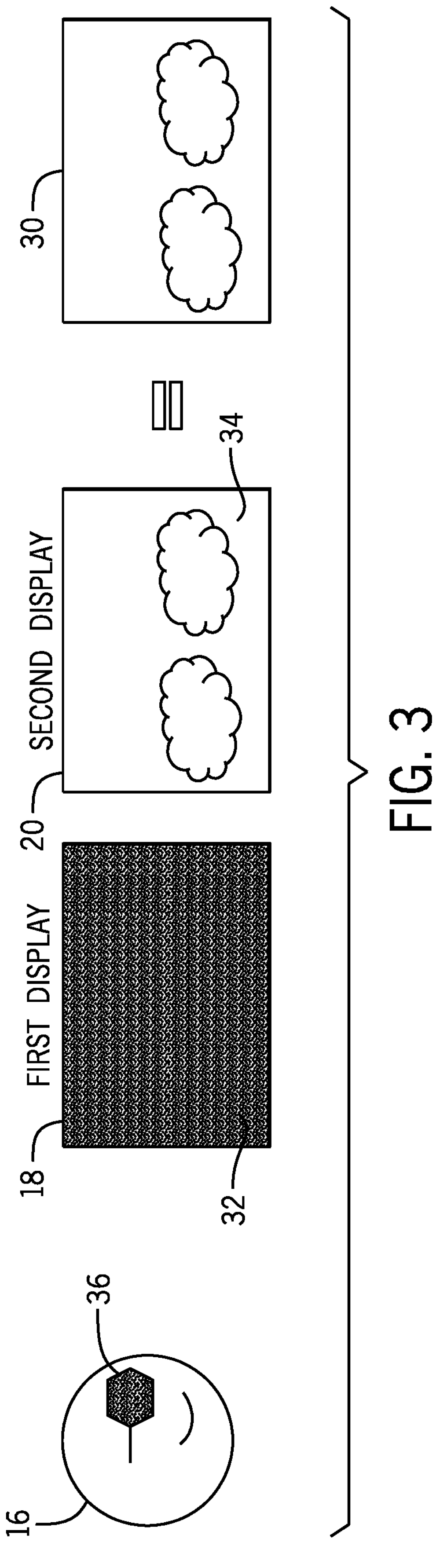
FIG. 3 illustrates the displaying of elements by the visual effects system of FIG. 1 to create a visual effect that is viewable by the guest with the use of lenses, in accordance with an embodiment of the present disclosure.

FIG. 3 is an illustration of the visual effects system 12 of FIG. 1, in accordance with an embodiment of the present disclosure. In particular, FIG. 3 illustrates the guest 16 wearing the pair of glasses 36 and viewing the visualization area 30 via the first display 18 and the second display 20. In the illustrated embodiment, the pair of glasses 36 may include polarized lenses for both eyes of the guest 16. The first display 18 may include the polarization feature 19 (FIG. 1) that is oriented in a direction (e.g., first direction) that is orthogonal a direction (e.g., second direction) that is used to re-polarize the second display 20. Due to the orientation of the polarization feature 19 of the first display 18 being orthogonal to the polarized lenses of the pair of glasses 36, the transmitted element 32 of the first display 18 may appear darkened (e.g., visually black or deactivated) to the guest 16. Further, due to the polarized lenses of the pair of glasses 36, the second display 20 may be polarized. Therefore, the guest 16 may view the reflected element 34 of the second display 20 (and not the transmitted element 32 of the first display 18) in the visualization area 30.

For example, as shown in FIG. 3, the guest 16 is wearing the pair of glasses 36 with the polarized lenses. The polarization characteristics (e.g., polarization filters) for each of the polarized lenses may be the same; for example, vertical. In this example, the polarization feature 19 of the first display 18 is oriented in such a way that its polarization characteristics are horizontal. Therefore, the transmitted element 32 appears darkened or deactivated to the guest 16 through the polarized lenses of the pair of glasses 36. Moreover, the reflected element 34 may include an image of two clouds. Thus, the guest 16 may view the reflected element 34, including the image of the two clouds in the visualization area 30. In this manner, the guest 16 may create a new visual effect by wearing the pair of glasses 36, which enable the appearance of replacing the transmitted element 32 with the reflected element 34.

Figure 4:
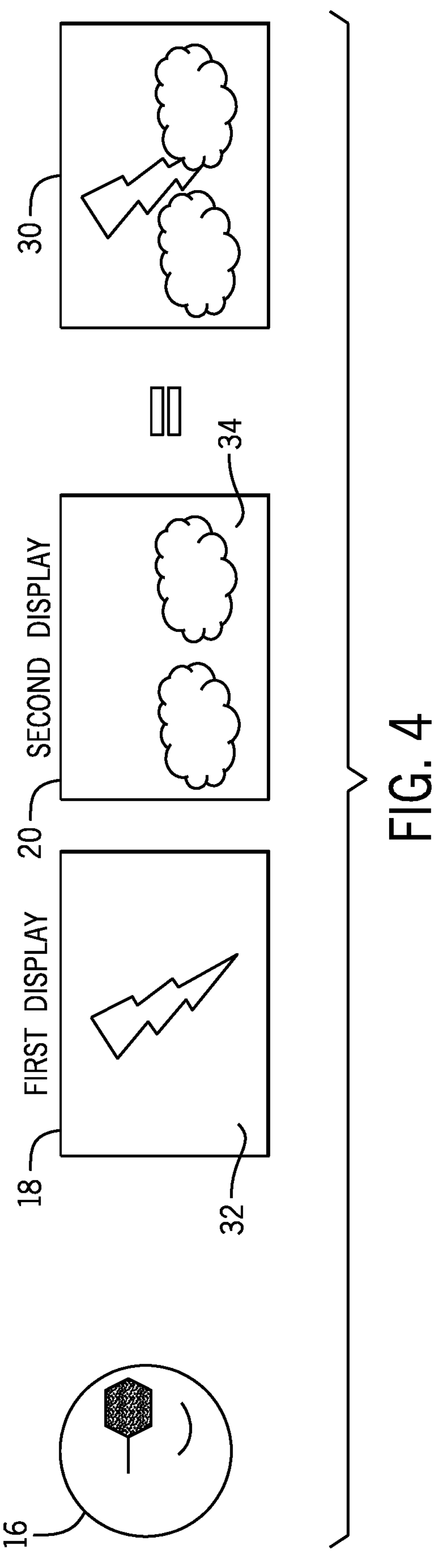
FIG. 4 illustrates the displaying of elements by the visual effects system of FIG. 1 to create a visual effect of the elements overlaid onto one another and viewable by the guest with the use of lenses, in accordance with an embodiment of the present disclosure.

FIG. 4 is an illustration of the visual effects system 12 of FIG. 1, in accordance with an embodiment of the present disclosure. In particular, FIG. 4 illustrates the guest 16 wearing the pair of glasses 36 and viewing the visualization area 30 via the first display 18 and the second display 20. The pair of glasses 36 may include polarized lenses for both eyes. The first display 18 may include the polarization feature 19 (FIG. 1) that is oriented in any direction except orthogonal the direction that is used to polarize the second display 20. In this manner, interference or blockage (e.g., blocking of light that is polarized) by the orthogonal orientation may be prevented. That is, the polarization feature 19 may be positioned in any orientation, with the exception of the orientation that directly opposes the orientation used to polarize the second display 20 to enable view of the first display 18 and the second display 20. As such, when the guest 16 dons the pair of glasses 36 with the polarized lenses, the transmitted element 32 of the first display 18 may remain visible to the guest 16. Further, the pair of glasses 36 may enable the polarization of the second display 20. Therefore, the reflected element 34 of the second display 20 may also be visible to the guest 16. As such, the reflected element 34 of the second display 20 may appear to be overlaid or superimposed over the transmitted element 32 of the first display 18.

For instance, in FIG. 4, the first display 18 may include the polarization feature 19, in which the polarization characteristics are horizontal (or any direction other than vertical). The transmitted element 32 of the first display 18 may include the image of the lightning bolt. The second display 20 may use horizontal polarization characteristics (e.g., corresponding or same polarization characteristics) for re-polarization. Moreover, the reflected element 34 of the second display 20 may include the image of the two clouds. The guest 16 is wearing the pair of glasses 36 with the polarized lenses, including the horizontal polarization characteristics. Thus, the guest 16 may view the reflected element 34 of the image of the second display 20 superimposed on the transmitted element 32 of the first display 18. Indeed, the clouds may appear to be overlaid over the lightning bolt to the guest 16.

FIG. 5 is an illustration of the visual effects system 12 of FIG. 1, in accordance with an embodiment of the present disclosure. In particular, FIG. 5 illustrates the view of the visualization area 30 by the guest 16 (represented as the guest 16A without the pair of glasses 36 or the guest 16B with the pair of glasses). The first display 18 may include the polarization feature 19 (FIG. 1), and the second display 20 may not be polarized.

In one embodiment, the guest 16A may view the visualization area 30 with the naked eye. As mentioned herein, the transmitted element 32 may be visible to the guest 16A, and the reflected element 34 may appear as the white light. Therefore, the transmitted element 32 may be a two-dimensional (2D) image visible to the guest 16A and may appear brighter due to the white light.

As illustrated in FIG. 5, and as described herein with respect to FIG. 2, the white light of the reflected element 34 may be combined with the image of the lightning bolt of the transmitted element 32 of the first display 18. Thus, the visualization area 30 may display a brighter image of the lightning bolt for the viewing by the guest 16A.

In one embodiment, the guest 16B may wear the pair of glasses 36 and may view the visualization area 30. The pair of glasses 36 may include a polarized lens 48 and a clear lens 50 (e.g., a non-polarized lens). The clear lens 50 may enable visualization of the transmitted element 32 of the first display 18. Moreover, the polarized lens 48 may enable visualization of the reflected element 34 of the second display 20. The guest 16B may view both the transmitted element 32 and the reflected element 34 simultaneously via each respective lens (e.g., the polarized lens 48 and the clear lens 50), which may create a three-dimensional (3D) image for visualization by the guest 16B.

As an example, as shown in FIG. 5, the guest 16B wears the pair of glasses 36. The transmitted element 32 may include the image of the lightning bolt. The reflected element 34 may also include an image of a lightning bolt. Therefore, the guest 16B may view the transmitted element 32 and the reflected element 34 combined in the visualization area 30 to create the 3D image for the guest 16B. In this manner, the guest 16 may decide whether they would like to view content in 2D or 3D by selecting to view the content with the naked eye or with the pair of glasses 36.

FIG. 6 is a flow diagram of a method 60 for providing a visual effect to a guest via a visual effects system. The method 60 disclosed herein includes various steps represented by blocks. It should be noted that at least some steps of the method 60 may be performed as an automated procedure by a system, such as the visual effects system 12 of FIG. 1. Although the flow chart illustrates the steps in a certain sequence, it should be understood that the steps may be performed in any suitable order and certain steps may be carried out simultaneously, where appropriate.

In step 62, the method 60 may begin with displaying a first image on a first display that is polarized to enable visualization by the guest. For example, a controller may generate and transmit image data to the first display to cause the first display to provide the first image based on the image data. In step 64, a second image may be displayed on a second display. For example, the controller may generate and transmit additional image data to the second display to cause the second display to provide the second image based on the additional image data. The first display may be in direct view of the guest, and the second display may be positioned out of view of the guest.

In step 66, the second image may be reflected onto the first display. That is, a beam splitter may be positioned to reflect the second image onto the first display to combine imagery from the first display and the second display. However, the second display may not be polarized such that the second image may appear as a white light to the guest.

In step 68, a first polarization lens may be placed to enable visualization of the first image and the second image together. As noted herein, in one embodiment, the first display may include a polarization feature that may be oriented in any direction except orthogonal to a direction used to re-polarize the second display. For example, the polarization feature is oriented in such a way that its polarization characteristics are vertical. Further, the polarization characteristics used to re-polarize the second display may also be vertical. Thus, the first polarization lens, including vertical polarization characteristics, may be placed. In this manner, a continued visualization of the first image may be enabled. Additionally, the first polarization lens may re-polarize the second display, thus enabling visualization of the second image combined with the first image.

In step 70, a second polarization lens may be placed (e.g., in glasses over eyes of the guest) to enable visualization of the second image without the first image. As mentioned herein, in one embodiment, the first display may include the polarization feature that may be oriented in a direction orthogonal to the direction used to polarize the second display. For instance, the polarization characteristics used to polarize the second display may be vertical. Moreover, the polarization feature of the first display may be oriented in such a way that its polarization characteristics are horizontal. Thus, the second polarization lens, including vertical polarization characteristics, may be placed. As such, the first display may appear to be deactivated to the guest. Further, the second polarization lens may re-polarize the second display, which may cause the second image to be visible to the guest without the first image.

Accordingly, guests may control the visual effects they experience in an attraction. The guest may control whether they view images in 2D or 3D (e.g., guest(s) with motion sickness that may not wish to experience 3D visual effects may choose not to wear the glasses so as to view only 2D visual effects; guest(s) may choose to view 2D or 3D effects at different times; guest(s) may be directed to wear the glasses and/or otherwise positioned relative to the polarization film to alternately view the first image, the second image, or both). Further, the guest may experience the attraction a first time and subsequently experience the attraction a second time for a new experience at the same attraction. This may provide a more enjoyable experience for guests at the attraction while also providing some control to the guests.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112 (f). However, for any claims containing elements designated in any other manner, it is intended that such elements are not to be interpreted under 35 U.S.C. 112(f).

The invention claimed is:

1. A visual effects system, comprising:

a first display configured to display a first image, wherein the first display comprises a polarized filter on or in the first display;

a second display configured to display a second image, wherein the second display is not polarized, and wherein the second image is configured to be perceived by a guest as white light based on the second display not being polarized; and a beam splitter positioned to enable the guest to view the first image through the beam splitter and a reflection of the second image via the beam splitter, wherein the reflection of the second image is configured to combine with the first image to cause the first image to be perceived by the guest as a brighter version of the first image.

2. The visual effects system of claim 1, comprising a controller communicatively coupled to the first display, the second display, or both, the controller configured to:

transmit first image data to the first display to cause the first display to display the first image; and transmit second image data to the second display to cause the second display to display the second image.

3. The visual effects system of claim 1, comprising an additional polarized filter configured to polarize the second display.

4. The visual effects system of claim 3, wherein the polarized filter is oriented differently than the additional polarized filter.

5. The visual effects system of claim 3, wherein the polarized filter is oriented the same as the additional polarized filter.

6. The visual effects system of claim 3, wherein each of the polarized filter and the additional polarized filter comprise linear polarized filters, and the linear polarized filters are oriented orthogonally to each other.

7. The visual effects system of claim 3, wherein each of the polarized filter and the additional polarized filter comprise circular polarized filters, and the circular polarized filters are oriented with opposite handedness to each other.

8. The visual effects system of claim 3, wherein the additional polarized filter comprises eyewear or a polarization film.

9. The visual effects system of claim 8, wherein the additional polarized filter comprises the eyewear, and the eyewear comprises:

a frame;

a first lens and a second lens coupled to the frame; and a lens polarized filter on the first lens.

10. The visual effects system of claim 9, wherein the eyewear comprises the lens polarized filter on the second lens.

11. The visual effects system of claim 9, wherein the second lens is not polarized.

12. The visual effects system of claim 1, wherein each of the first display and the second display comprises a two-dimensional display, a three-dimensional display, or a volumetric display.

13. The visual effects system of claim 1, wherein each of the first display and the second display comprises a liquid crystal display (LCD), a light emitting diode (LED) display, an organic light emitting diode (OLED) display, a micro LED display, or a transparent LCD display.

14. A visual effects system, comprising:

a first display configured to display a first image, wherein the first display comprises a polarized filter on or in the first display;

a second display configured to display a second image, wherein the second display is not polarized;

a beam splitter positioned to enable a guest to view the first image through the beam splitter and a reflection of the second image via the beam splitter at a first time; and eyewear configured to be worn by the guest at a second time different than the first time, wherein the eyewear comprises a first lens comprising an additional polarized filter configured to cause the reflection of the second image to be perceived by the guest while blocking the first image from being perceived by the guest.

15. The visual effects system of claim 14, wherein the additional polarized filter is configured to be orthogonal relative to the polarized filter when the eyewear is properly worn by the guest.

16. The visual effects system of claim 15, wherein the eyewear comprises a second lens comprising the additional polarized filter.

17. The visual effects system of claim 15, comprising an additional eyewear configured to be worn at a third time different than the first time and the second time, wherein the eyewear comprises a second lens that is not polarized, and the eyewear enables the guest to view both the first image and the second image to create a three-dimensional image.

18. A method of operating a visual effects system, the method comprising:

generating, at a processor, image data for a first display and a second display;

instructing, via the processor, transmission of the image data to the first display and to the second display, wherein the first display is configured to display a first image based on the image data and the second display is configured to display a second image based on the image data;

reflecting, via a beam splitter, the second image toward the first display;

using a first polarization filter associated with the first display at a first time to enable visualization of the first image by a guest; and placing a second polarization filter between the guest and the first display at a second time that is different than the first time to enable visualization of the second image by the guest without the visualization of the first image.

19. The method of claim 18, wherein using the first polarization filter at the first time enables visualization of the first image and the second image together as a combined image, wherein the second image is perceived as white light configured to cause the first image to be perceived by the guest as a brighter version of the first image.

20. The method of claim 18, wherein a respective orientation of the first polarization filter is orthogonal to a respective orientation of the second polarization filter, and wherein the second polarization filter is configured to cause the first display to be perceived by the guest as deactivated.

* * * * *